Patented Nov. 25, 1947

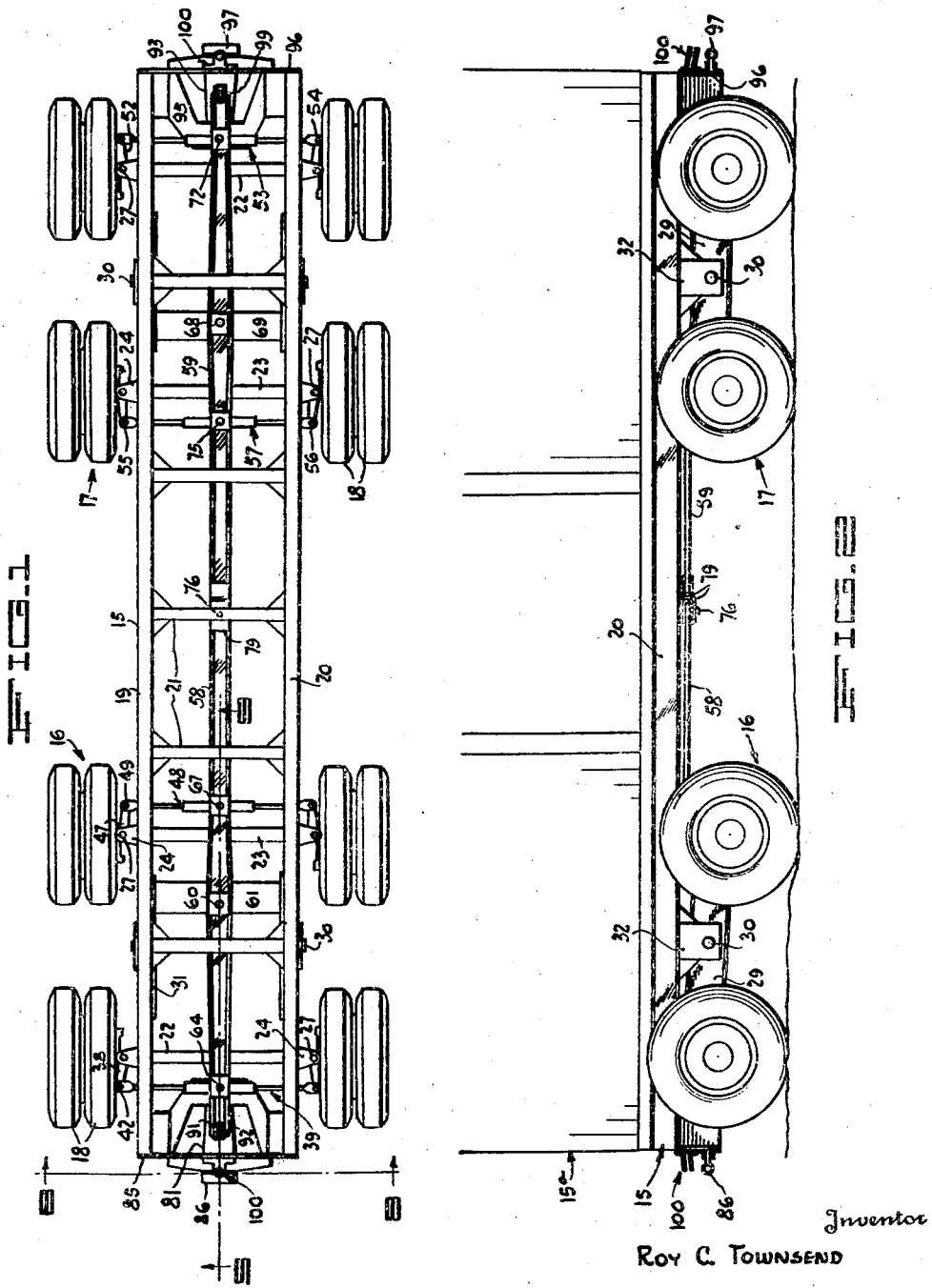

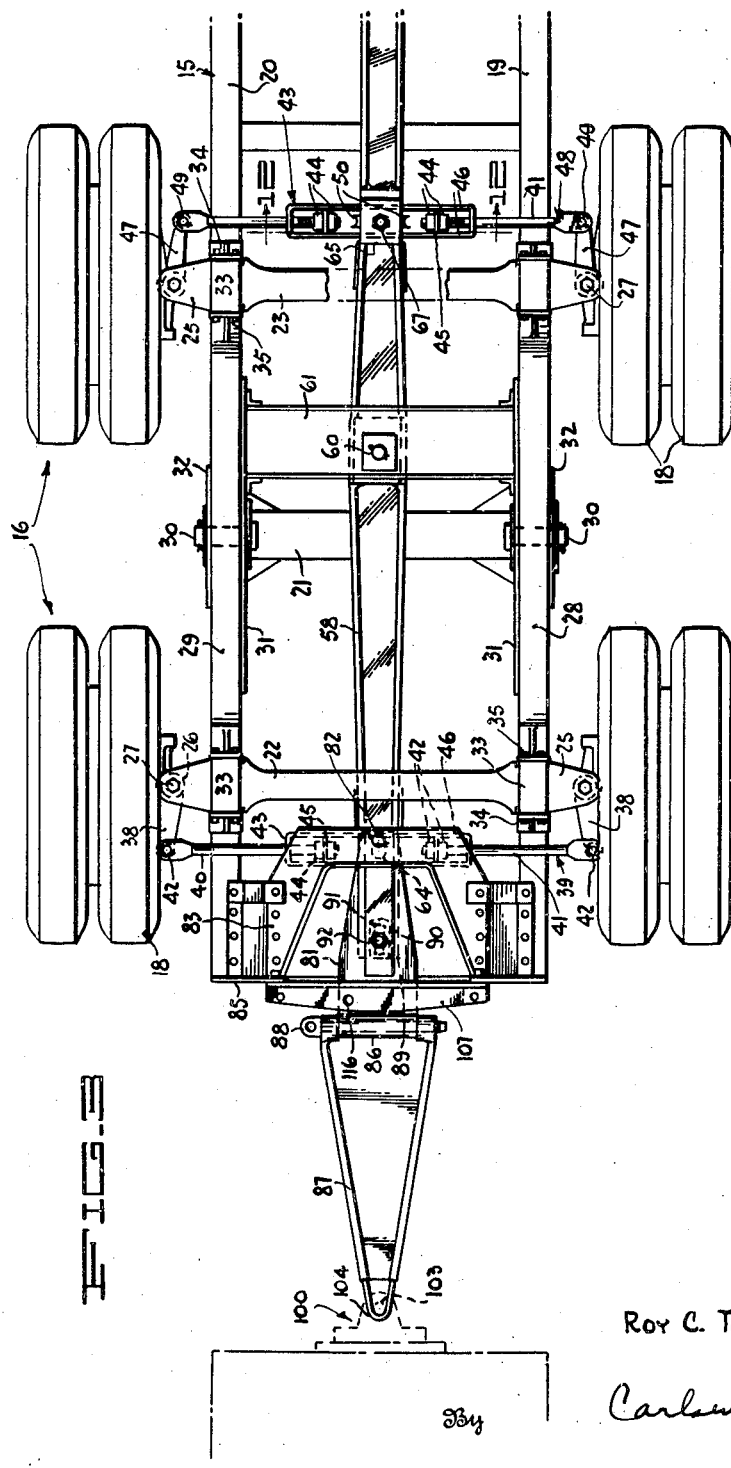

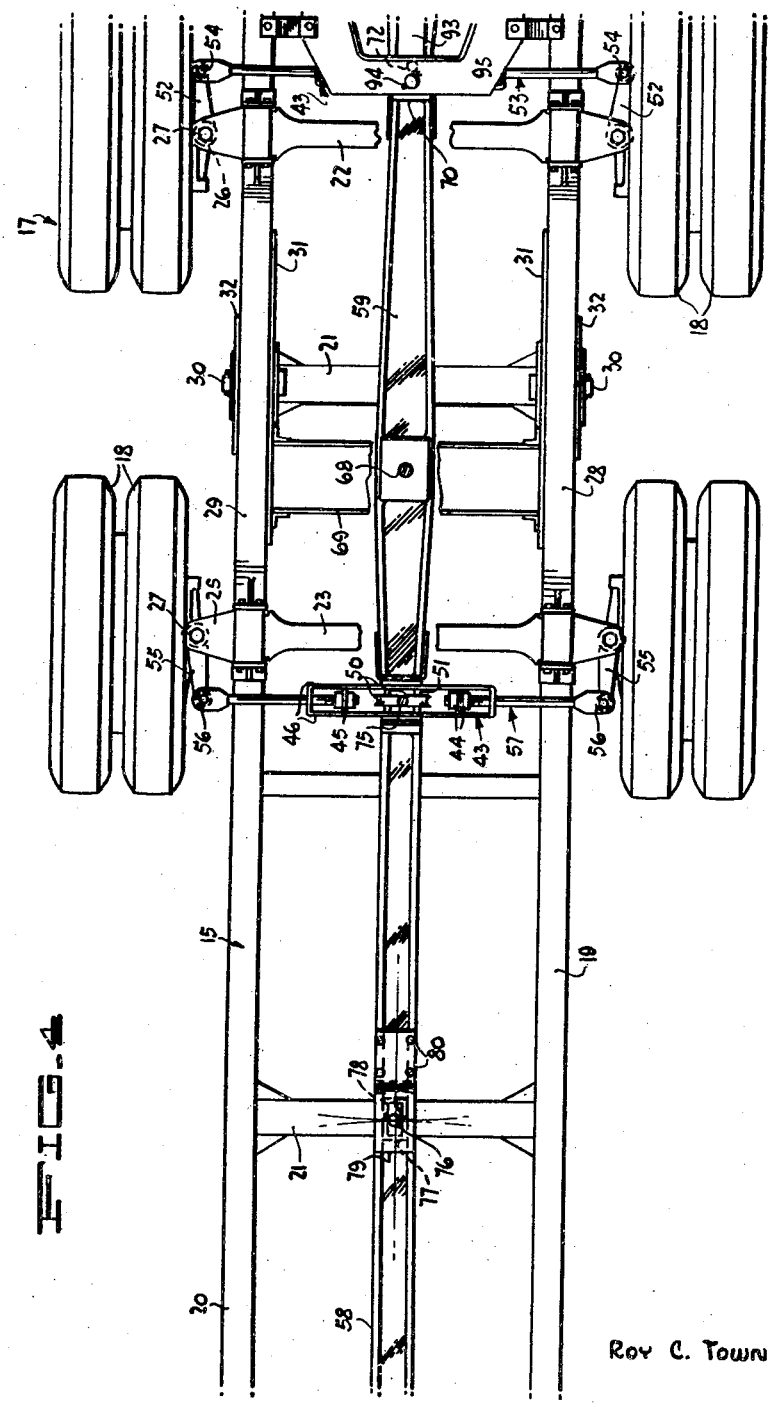

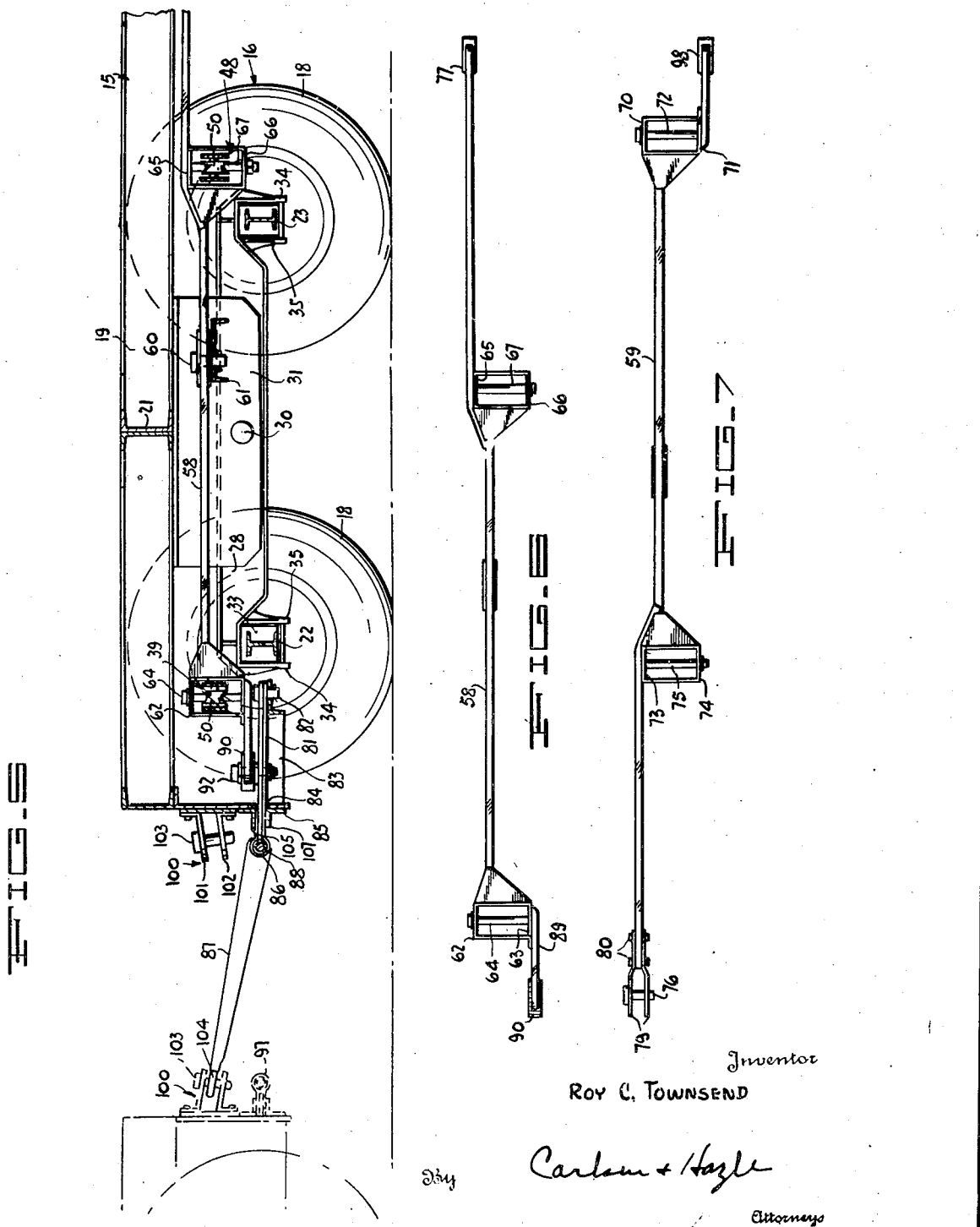

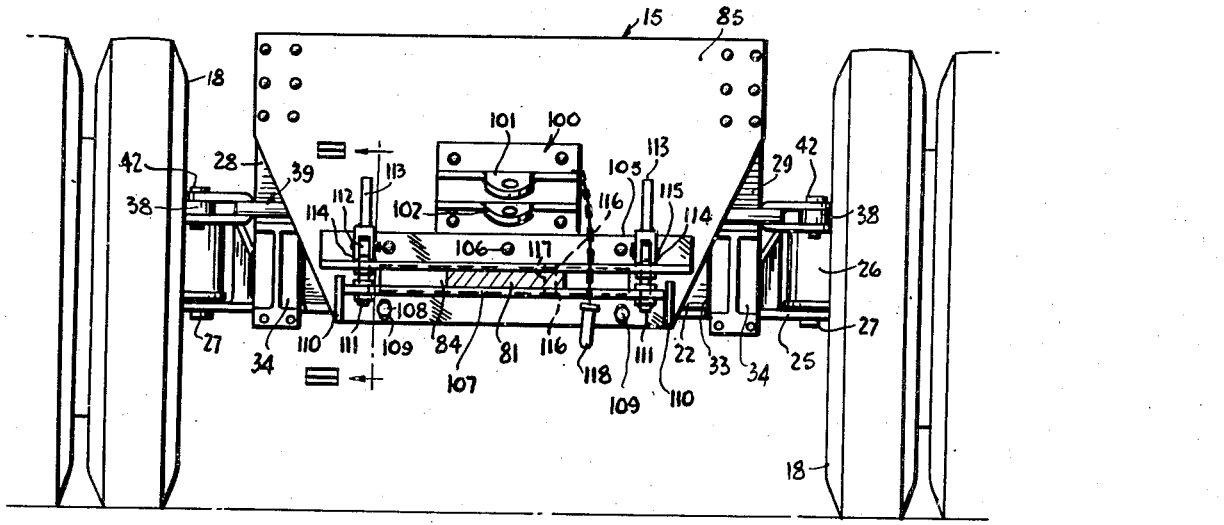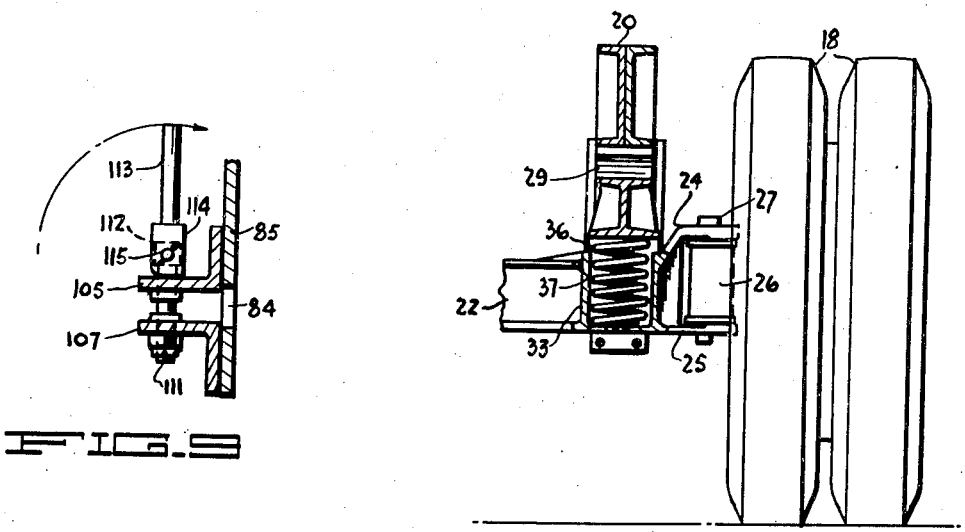

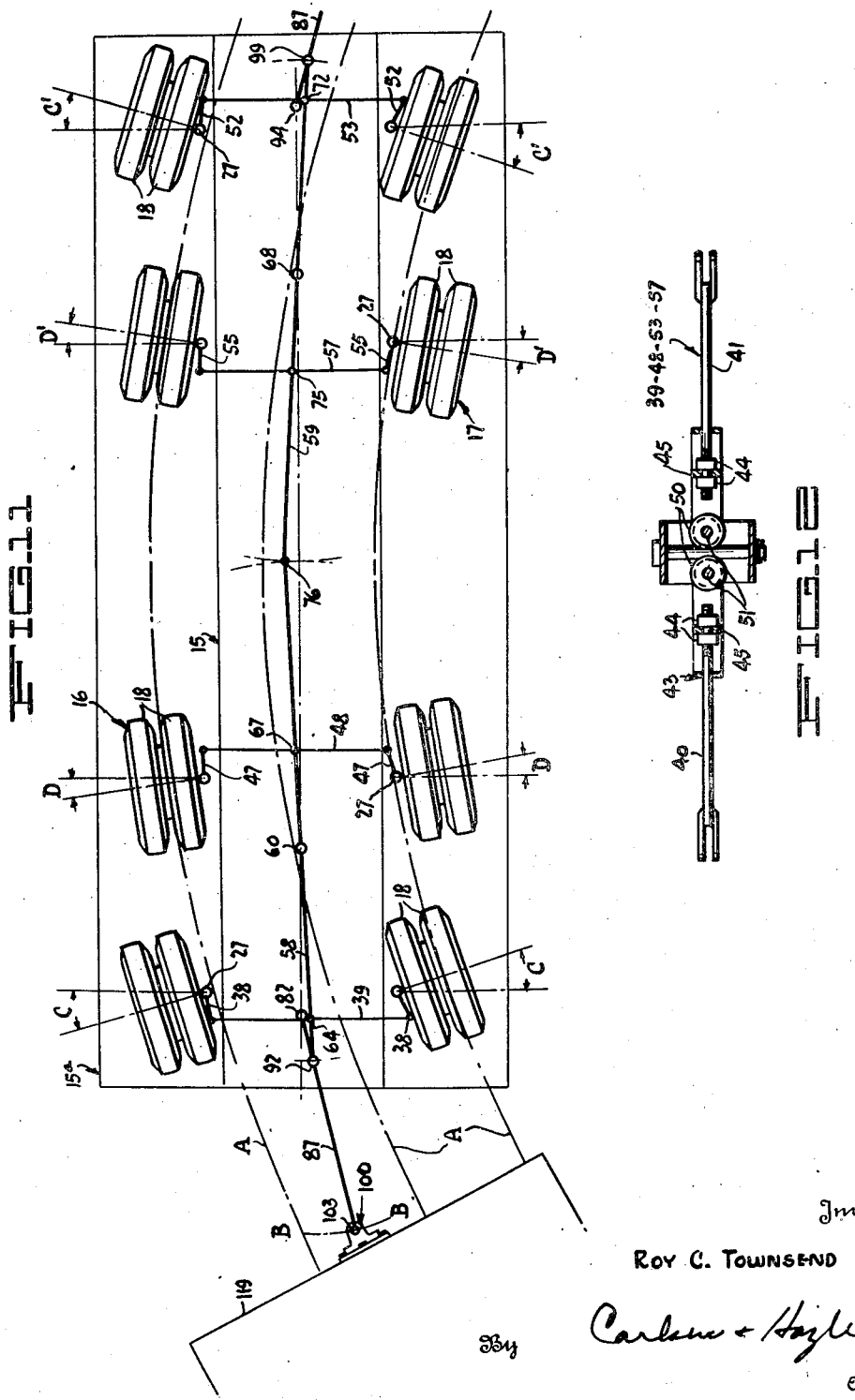

2,431,626

UNITED STATES PATENT OFFICE 2,431,626

SHORT TURN TRAILER VEHICLE

Roy C. Townsend, La Crosse, Wis.

Application May 25, 1945, Serial No. 595,680

8 Claims. (Cl. 280—100)

This invention relates generally to improvements in vehicles and more particularly to trailer type vehicles with steerable wheels and mechanism for steering the same.

The primary object of the invention is to provide a trailer type vehicle well adapted to heavy duty high speed operation, and adapted to be connected several in line for towing behind a draft or tractor unit and with means for steering all wheels of the trailers in such manner as to cause them to trail readily and without weaving. Another object is to provide a vehicle construction and arrangement whereby a train or series of trailers will be enabled to negotiate comparatively sharp turns, and wherein the steering mechanism operates in such manner that the wheels of each successive trailer will remain positioned for straight ahead travel until that trailer actually reaches a curve and will then assume steering angles proper to follow the curve. Another object is to provide a vehicle of this nature in which the several wheels are arranged for relative up and down movements to maintain even load distribution at all times, and in which the steering mechanism is so arranged that such movements of the wheels will not in any way interfere with steering operations or disturbing their proper alignment.

These and other objects of the invention will be made apparent in the course of the following detailed specification forming a part hereof, and in which reference is made to the accompanying drawings wherein—

Fig. 1 is a plan view of the chassis of a trailer vehicle in accordance with my invention.

Fig. 2 is a side elevation, also showing the lower part of the body or car mounted upon the chassis.

Fig. 3 is an enlarged bottom view of one end portion of the chassis, illustrating the connection thereof to a towing unit.

Fig. 4 is a similar view of the center and other end portion of the vehicle.

Fig. 5 is an enlarged vertical longitudinal sectional view along the line 5—5 in Fig. 1 but showing the draft connection made as in Fig. 3.

Figs. 6 and 7 are side elevations of the two complementary steering bars or members used in each vehicle.

Fig. 8 is an enlarged end view of one vehicle, taken substantially along the line 8—8 in Fig. 1.

Fig. 9 is an enlarged detail sectional view along the line 9—9 in Fig. 8.

Fig. 10 is a detail view in vertical cross section through the axle and bolster connection adjacent one wheel.

Fig. 11 is a diagrammatic plan view illustrating the relatively angular positions of the wheels when changing direction of travel.

Fig. 12 is a transverse detail sectional view along the line 12—12 in Fig. 3.

Referring now more particularly and by reference characters to the drawing, I have shown therein a trailer or vehicle chassis designated generally at 15 of rectangular, elongated shape and supported adjacent each end by four wheeled trucks or wheel assemblies indicated generally and respectively at 16 and 17. Each wheel of the trucks is here shown as including dual tires 18. The vehicle is reversible end for end, or may be towed from either end, and the respective trucks 16 and 17 are essentially duplicates in construction and arrangement.

The chassis 15 comprises side beams 19 and 20 rigidly connected by appropriately located cross bars indicated throughout at 21 to form a rigid frame structure adapted to support any desired type of body or carrier such as indicated fragmentarily at 15ᵃ in Fig. 2 and diagrammatically in Fig. 11.

Each truck 16 and 17 comprises longitudinally spaced transversely extending axles 22 and 23 disposed beneath the chassis. Although the trailer is reversible, the end to the left in the drawing will be called the front end for convenience in this description and the truck 16 the front truck. At their extremities the axles 22 and 23 are forked to form upper and lower apertured ears 24 and 25 between which are placed the bearing portions 26 of the usual wheel and brake supporting knuckle members. These bearings 26 are pivotally attached to the axles by knuckle pins 27 and the arrangement is such that the various wheels 18 may swing freely for steering movements at the ends of the axles. Each truck also includes a pair of bolsters 28 and 29, which connect the axles 22 and 23 and extend lengthwise beneath the sides 19 and 20 of the chassis. Intermediate their ends said bolsters 28 and 29 are pivotally supported upon pins 30 supported by inner and outer guide plates 31 and 32 which hang from the frame sides 19—20. The pivotal arrangement is such that the bolsters may oscillate in upright longitudinal planes beneath the chassis, moving upwardly and downwardly at their ends as will be understood. As best seen in Figs. 5, 8 and 10 the ends of the axles 22 and 23 are provided with squared portions 33 which are loosely straddled by downwardly turned forks 34—35 in the ends of the bolsters 28 and 29 and springs 36 are placed in upwardly opening sockets 37 on the bolster ends. This arrangement is such that the axles 22 and 23 may play upwardly and downwardly at their wheel supported ends allowing the wheels to accommodate themselves to road irregularities while maintaining even load distribution to all the wheels, as indicated in Fig. 2, and the springs 36, of course, provide shock absorption. This articulated axle-bolster construction is similar to that disclosed in my prior Patent No. 2,316,374 for Vehicle supporting truck, issued April 13, 1943, to which attention is invited for greater details of the action of this now well known wheel suspension arrangement.

In the front truck 16 the knuckle members of the front pair of wheels are provided with forwardly extending steering arms 38 which are connected by a tie rod indicated generally at 39 and extending beneath the chassis 15. For convenience in aligning these wheels the tie rod 39 comprises outer rod sections 40—41 pivotally connected at their outer ends at 42 to the arms 38 and entering the ends of a rectangular yoke or connecting member 43 at their inner ends. Turret nuts 44 are screwed on the inner ends of the rod sections 40—41 at opposite sides of plates 45 secured between the sides 46 of the yoke 43 and it will be apparent that, by adjusting these nuts 44, the overall length of the tie rod 39 may be adjusted and the steering angles of the wheels thus regulated. The rear wheels are similarly provided with, in this case, rearwardly turned steering arms 47 to which the outer ends of a tie rod 48 are pivoted at 49. This tie rod 48 has the same type of adjustment as the rod 39, as designated by similar reference characters. It will be noted that each yoke 43 carries a pair of grooved rollers 50 journaled upon pins 51 and having adjacent grooved peripheries spaced apart transversely of the vehicle, for a purpose presently to appear.

The rearmost wheels of the rear truck 17 have rearwardly turned steering arms 52 to which the ends of a tie rod 53 are pivoted at 54. The forward wheels of this rear truck have forwardly turned steering arms 55 connected at 56 to the outer ends of a tie rod 57. Both of these rods 53 and 57 are provided with the aforesaid adjustment yoke and nuts as indicated by the same reference characters and are each provided with the pairs of grooved rollers 50.

Extending centrally and lengthwise the full length of the chassis and located therebeneath is a steering linkage which comprises as its primary elements front and rear steering bars 58 and 59 arranged in end to end relation. The front steering bar 58 is fulcrumed on a pin 60 carried by a cross bar 61 rigidly supported between the chassis sides, said pin being located between the front and rear axles 22 and 23 of the front truck 16 but nearer to the said rear axle. The steering bar is located and supported well above these axles and at its forward end where it traverses the front wheel tie rod 39 the bar is formed with a pivot carrier, the essential elements of which are upper and lower rigidly connected and braced plates 62 and 63 which support an upright pivot pin 64. This pivot pin 64 is positioned between the rollers 50 of the forward tie rod 39 which are so spaced as to fit opposite sides of the pin, and the distance vertically between the plates 62 and 63 is such that they clear opposite upper and lower edges of the yoke member 43 by a substantial amount. Where the bar crosses the rear wheel tie rod 48 the rod also has a pivot carrier having upper and lower plates 65—66 supporting an upright pivot pin 67 which is positioned between the rollers 50 of this tie rod 48. It will thus be seen that oscillating movements of the front steering bar 58 about the pin 60 will, through the pins 64-67, be translated to opposite endwise movements of the respective tie rods 39 and 48, crosswise with respect to the vehicle as a whole. Since the steering arms 38 and 47 are oppositely extended with reference to the wheel pivots these opposite movements of the radius rods will result in angling or steering adjustments of the front and rear wheels of this front truck 16 in the same direction.

The rear steering bar 59 is fulcrumed upon a pin 68 carried by a cross bar 69 rigidly supported from the chassis frame sides, between the axles 22 and 23 and nearer axle 23, and the rear steering bar 59 adjacent its rear end where it crosses the tie rod 53 of the rear truck 17, is likewise provided with a pivot mechanism having upper and lower plates 70 and 71 supporting a pivot pin 72 which is positioned between the grooved rollers 50, forming part of the adjustment mechanism 47 of said tie rod. In similar manner this steering bar 59 has upper and lower plates 73 and 74 which support a pivot pin 75 between the rollers 50 of the forward tie bar 57 of the rear truck. Thus it will be seen that the same steering action takes place at the rear truck upon oscillation of the rear steering bar.

The front and rear steering bars 58 and 59 thus supported and connected to the respective tie rods are themselves connected at the center of the vehicle by a pivot pin 76. As clearly shown the bars extend toward each other at these ends and one bar has a rectangular, bearing yoke 77 formed with a slot 78 extending lengthwise and receiving the pin 76 which is carried in vertically spaced connecting plates 79 secured at 80 to the other bar. The slot 78 provides the play necessary due to the divergent arcs in which the bars swing at their connected ends as indicated in dot-dash lines in Fig. 4.

Mounted at each end of the chassis 15 is a drawbar and at the front end of drawbar 81 is pivoted at its rear end upon a pin 82 which is carried by a bridge frame 83 rigidly secured to and supported below this end of the chassis frame 15. The drawbar 81 is supported below the pivot structure at the forward end of the steering bar 58 and extends forwardly and loosely out through a transverse slot 84 in an end plate 85 secured across the forward end of the chassis. The outer or forward end of the drawbar is provided with a transversely extending hinge loop or eye 86 to which may be detachably pivoted a tongue 87 by means of a removable pin 88 as seen in Fig. 3. The steering bar 58 has an end 89 extending forwardly from beneath its forward tie rod pivot pin 64, over the drawbar 81, and this end 89 has a rectangular yoke 90 forming a longitudinally extending slot 91 to receive a pivot pin 92 which is carried by the drawbar forwardly of its pivoted rear end.

In a similar fashion the rear end of the vehicle has a drawbar 93 which is pivoted at one end on a pin 94 carried by a bridge frame 95 which is pivoted at one end on a pin 94 carried by a bridge frame 95 and which extends out through a slot in an end plate 96 carried by that end of the chassis. The outer or rear end of this drawbar 93 has a hinge loop 97 for connection thereto of a tongue 87 when required, and the rear extremity of the steering bar 59 has a slotted loop 98 for the reception of a pivot pin 99 carried by this drawbar in the same manner as previously described.

Above the outer or exposed ends of the drawbar the end plates 85 and 96 are each provided with hitch connections designated generally at 100 and comprising upper and lower ears 101—102 apertured to receive a removable hitch pin 103. The forward end of the tongue 87 has a loop 104 to receive the pin 103 when this end of the tongue is placed between the ears 101—102 and it will thus be seen that each chassis may be connected to the one next ahead when arranging the chassis in a train of several.

Secured to each end plate 85 and 96 is a friction lock mechanism for the respective drawbars. Each such mechanism comprises an upper rigid cross bar 105 (Figs. 8 and 9) secured at 106 to the end plate and extending across the upper side of the slot 84 through which the drawbar projects and in contact with the upper surface thereof. A lower friction bar 107 is arranged below the drawbar and is supported for up and down adjustments by bolts 108 projecting through vertically elongated slots 109 in this bar. Guide ribs 110 are secured to the end plate and slidably engage the ends of the bar 107 to guide it in its up and down movements. Bolts or pins 111 are secured near each end of the bar 107 and project loosely up through the upper bar 105, being provided at their upper ends with eyed heads 112 to which are pivoted handles 113 having forked ends 114 to straddle said heads and accommodate the pivot pins 115 by which the parts are connected. The arrangement is such that when the handles 113 are swung upward to the positions shown in Figs. 8 and 9 the forked ends 114 will cam downwardly against the upper cross bar 105 pulling the bolts 111 upwardly and drawing the friction bar 107 upwardly tight against the underside of the drawbar. Thus lateral swinging movements of the drawbar are frictionally braked for a purpose presently to be described. When the handles 113 are swung downwardly the cam action is released and the bar 107 may drop clear of the drawbar to relieve this friction lock on the drawbar as will be understood.

The bars 105 and 107 are provided with openings 116 adapted to register with a similar opening 117 in the associated drawbar to receive a lock pin 118 by which the drawbar, and entire steering linkage, may be locked when required for any reason.

*Operation*

In practice one tongue 87 is connected between the front end of each vehicle and the rear end of the one next ahead but for convenience Fig. 11, in which the steering action is diagrammed, shows only a single vehicle with its tongue connected to the hitch 100 of a towing unit indicated at 119. So long as the vehicles travel a straight course the steering mechanism will remain in an inactive or neutral position with the wheels 18 properly positioned for such travel. The wheels may, however, at all times move relatively up and down as may be required by minor irregularities in the road surface, and such action will in no way interfere with or disturb the wheel alignment, due to the freedom for swinging movements, in transverse upright planes, of the tie rods 39, 48, 53 and 57 provided by the rollers 50 which engage the respective pivot pins 64, 67, 72 and 75, as will be clearly apparent.

As the towing vehicle, be it the tractor or powered unit, or the trailer next ahead in a train, enters a curve, however, such as indicated by the lines A in Fig. 11, the hitch 100 thereon being rigid will naturally shift inwardly from a position straight ahead of the towed trailer, as indicated by the arc B—B. The tongue 87 and drawbar 81 are thus swung toward the inside of the curve about the pin 82 and this action is transmitted through the pin 92 to the forward end of the steering bar 58, swinging it about its pivot pin 60. The tie rods 39 and 48 of the front truck 16 are thus shifted in opposite directions angling the wheels 18 thereof in proper direction to steer the trailer about the curve. The amplitude of these movements, and others presently to be described, will vary according to the sharpness or radius of the curve which the towing unit enters and by proper choice of the various pivot locations and leverages involved the wheels will be angled to precisely the correct positions to closely follow the curved paths A without weaving and otherwise deviating from the proper lane along the highway.

This movement of the front steering bar 58 is also transmitted to rear steering bar 59 through the connecting pin 76 and the latter bar thus swings about its pivot 68 and moves the tie rods 53 and 57 endwise in opposite directions. Such movement of the tie rod angles the wheels 18 of the rear truck 17 oppositely to those of the front truck 16, so that the rear end of the trailer will properly follow around the curve as clearly indicated in Fig. 11. As the towing vehicle straightens out on clearing the curve the steering linkage will, of course, return to normal position and it will be apparent also that the wheels will be oppositely angled when a turn is being made in a direction opposite to that here shown.

Attention is called at this point to the different leverages with which the steering bar 58 operates upon the front and rear wheels of the front truck 16. Due to the described off center location of the steering bar pivot 60 with respect to the respective tie rods 39 and 48 it will be evident that, for a given amplitude of movement of the steering bar, the front wheels will be angled through arcs C greater than the corresponding movement of the rear wheels as indicated by arcs D. The same is true of the rear truck 17, the wheels nearest the end of the trailer moving through arcs C' greater than the corresponding arcs D' as clearly indicated. As a result the wheels all assume travel positions parallel with the curved paths indicated at A.

The friction lock mechanism for the drawbar 81 of the front trailer is important in that, by placing this drawbar under pressure of the friction bar or shoe 107 as has been described, any tendency toward erratic swinging of the bar and resulting side weaving or swerving of the trailer is eliminated. It will be apparent that with the forwardmost drawbar and tongue thus frictionally locked the steering linkage extending through a whole train of trailers will be held against slapping about since it is the forward vehicle which controls and initiates the steering movements of the whole train.

The trailers are of course fully reversible and may be towed from either end merely by connecting the tongue 87 as required.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Steering mechanism for a vehicle of the character described, comprising steering bars fulcrumed intermediate their ends to the frame of the vehicle and having outer ends extending adjacent the ends of the vehicle, pin and slot means pivotally and slidably connecting the inner ends of the steering bars for operating them in unison but in opposite directions on their respective fulcrums, drawbars connected to the outer ends of the steering bars, and a draft tongue selectively connectable to the drawbars for steering the vehicle from either end.

2. In a vehicle of the character described having a plurality of steerable wheels connected by transversely movable and extending tie rods, steering mechanism for the wheels comprising at least one steering bar fulcrumed on a support between a pair of said tie rods and swingable at its ends transversely with respect to the vehicle, means connecting the steering bar to said tie rods for steering the wheels and a drawbar member swingably supported on the vehicle and connected to one end portion of the steering bar for transmitting draft to the vehicle and swinging said steering bar to angle the wheels.

3. In a vehicle of the character described having a pair of front wheels and a pair of rear wheels, all supported for steering movements, the front wheels having steering arms extending in one direction and the rear wheels having steering arms extending in an opposite direction, separate tie rods connecting the steering arms of the front and rear wheels, a longitudinally extending steering bar pivotally supported on the vehicle for transverse swinging movements at opposite ends in opposite directions about a pivot axis located between the respective tie rods, and means connecting the steering bar to said tie rods for transmitting steering movements to the wheels in response to swinging movements of the steering bar.

4. In a vehicle of the character described having a pair of front wheels and a pair of rear wheels, all supported for steering movements, the front wheels having steering arms extending in one direction and the rear wheels having steering arms extending in an opposite direction, separate tie rods connecting the steering arms of the front and rear wheels, a longitudinally extending steering bar pivotally supported on the vehicle for transverse swinging movements at opposite ends in opposite directions about a pivot axis located between the respective tie rods, and means connecting the steering bar to said tie rods for transmitting steering movements to the wheels in response to swinging movements of the steering bar, the said pivot axis for the steering bar being located closer to the point at which the bar is connected to one tie rod than to the point of connection between the bar and other tie rods whereby the front and rear wheels will be angled through different arcs by movement of the steering bar.

5. In a vehicle of the character described having a pair of front wheels and a pair of rear wheels, all supported for steering movements, the front wheels having steering arms extending in one direction and the rear wheels having steering arms extending in an opposite direction, separate tie rods connecting the steering arms of the front and rear wheels, a longitudinally extending steering bar pivotally supported on the vehicle for transverse swinging movements at opposite ends in opposite directions about a pivot axis located between the respective tie rods, and means connecting the steering bar to said tie rods for transmitting steering movements to the wheels in response to swinging movements of the steering bar, the said pivot axis for the steering bar being eccentrically located with reference to the connections between the bar and said tie rods in such manner that the rear wheels will be moved through a shorter arc than the front wheels by a given movement of the steering bar.

6. In a vehicle of the character described having front and rear pairs of wheels supported for steering movements and also for relative up and down movements to maintain even load distribution upon uneven road surfaces, separate tie rods connecting the front and rear wheel pairs, a steering bar supported for transverse swinging movements, and means connecting the steering bar and the tie rods for steering the wheels responsive to swinging movements of the bar, said connecting means including upright pivot pins carried by the steering bar, and rollers carried by the tie rods for engaging opposite sides of the pins to transmit steering movements between the steering bar and tie rods with limited freedom for relative up and down movements therebetween.

7. A vehicle having laterally arranged tiltable bolsters supported on transversely disposed axles, pairs of dirigible wheels pivotally secured to the ends of the respective axles, transversely shiftable tie bars connecting the wheels of each pair, a connection between the tie bars whereby transverse movement of one tie bar will directly actuate the other tie bar, and means for actuating said connection, said connection comprising a steering bar fulcrumed to the vehicle at a point longitudinally between the tie bars and connected at its ends to the tie bars, the fulcrum center of steering bar being closer to one tie bar than the other whereby the steering action imparted to one pair of wheels will be more pronounced than that to the other pair of wheels.

8. In a vehicle having a rigid frame, a pair of trucks supporting opposite ends of the frame, both of said trucks having dirigible wheels adapted to be steerably angled with respect to its truck body, one of said trucks comprising a pair of bolsters pivoted to the frame, a pair of axles connecting the corresponding ends of the bolsters and supported by the wheels of said truck, means connecting all of the wheels of said one truck whereby they will be simultaneously steered, and other means extending from said connecting means to the other truck and operatively attached to the dirigible wheels of such other truck whereby the wheels of both trucks will be simultaneously actuated, said last identified means including a pair of steering bars respectively pivoted to the vehicle frame adjacent the respective trucks and being pivotally connected at adjacent ends between the two trucks.

ROY C. TOWNSEND.

(References on following page)

REFERENCES CITED

The following references are of record in the file of this patent:

UNITED STATES PATENTS

| Number | Name | Date |
|---|---|---|
| 1,191,809 | Michelin | July 18, 1916 |
| 1,421,402 | Cadman | July 4, 1922 |
| 1,567,492 | Clayton et al. | Dec. 29, 1925 |
| 1,728,818 | Arato | Sept. 17, 1929 |
| 1,739,708 | Carr | Dec. 17, 1929 |
| 1,747,580 | Fageol | Feb. 18, 1930 |
| 1,876,684 | Jonkhoff | Sept. 13, 1932 |
| 1,886,640 | Campbell, Jr. | Nov. 8, 1932 |
| 2,124,043 | Smith | July 19, 1938 |
| 2,154,957 | Perrard | Apr. 18, 1939 |
| 2,189,453 | Struensee | Feb. 6, 1940 |

FOREIGN PATENTS

| Number | Country | Date |
|---|---|---|
| 315,688 | Great Britain | Dec. 31, 1928 |
| 385,275 | Great Britain | Mar. 16, 1931 |
| 546,161 | France | Aug. 12, 1922 |